United States Patent
Ewanchuk et al.

(10) Patent No.: US 11,595,335 B2
(45) Date of Patent: Feb. 28, 2023

(54) METHOD AND DEVICE FOR ATTACHING MESSAGES STORED AT A DEVICE AS ATTACHMENTS TO A MESSAGE BEING COMPOSED AT THE DEVICE

(71) Applicant: BLACKBERRY LIMITED, Waterloo (CA)

(72) Inventors: Andrew John Ewanchuk, Baden (CA); Christopher Michael Fogel, Kitchener (CA); Ronesh Puri, Dundas (CA); Mahadevan Balasubramaniam, North Andover, MA (US)

(73) Assignee: BLACKBERRY LIMITED, Waterloo (CA)

( * ) Notice: Subject to any disclaimer, the term of this patent is extended or adjusted under 35 U.S.C. 154(b) by 757 days.

(21) Appl. No.: 14/817,547

(22) Filed: Aug. 4, 2015

(65) Prior Publication Data

US 2017/0041260 A1    Feb. 9, 2017

(51) Int. Cl.
  *G06F 15/16*   (2006.01)
  *H04L 51/08*   (2022.01)
  *H04L 51/066*  (2022.01)

(52) U.S. Cl.
  CPC .......... *H04L 51/08* (2013.01); *H04L 51/066* (2013.01)

(58) Field of Classification Search
  CPC .............................. H04L 51/08; H04L 51/066
  USPC ...................................................... 709/206
  See application file for complete search history.

(56) References Cited

U.S. PATENT DOCUMENTS

| | | | |
|---|---|---|---|
| 8,965,982 B1 * | 2/2015 | Sanjeev | H04L 51/04 455/412.1 |
| 9,319,563 B1 * | 4/2016 | Sadakuni | G06Q 10/107 |
| 2001/0054030 A1 * | 12/2001 | Igarashi | G06Q 10/107 705/401 |

(Continued)

FOREIGN PATENT DOCUMENTS

WO    WO-0154390 A1    7/2001

OTHER PUBLICATIONS

Title: How to insert an item (another mail message) in Outlook (Insert.pdf); Date: Jul. 11, 2011; Author: DPAweb; Link: http://dpaweb.hss.state.ak.us/training/jobaids/software/pdf/.*

(Continued)

*Primary Examiner* — Hannah S Wang
(74) *Attorney, Agent, or Firm* — Perry + Currier (57) ABSTRACT

A method and device for attaching messages stored at the device as attachments to a message being composed at the device. The device comprises: a memory storing a messaging application, a communication interface, a display device, and a processor configured to execute the messaging application to: render, at the display device, the message; in response to detecting selection of an attach icon in the message, render, at the display device, message icons, each message icon associated with a respective one of the stored messages; detect selection of at least one message icon; for each selected message icon, convert a stored message associated with the selected message icon into a Multipurpose Internet Mail Extension (MIME) attachment message; encode the message and each MIME attachment message into a MIME message; and, in response to detecting selection of a send icon of the message, transmit, via the communication interface, the MIME message.

15 Claims, 7 Drawing Sheets

(56) References Cited

U.S. PATENT DOCUMENTS

| | | | |
|---|---|---|---|
| 2002/0016818 A1 | 2/2002 | Kirani et al. | |
| 2002/0140987 A1* | 10/2002 | Ishikawa | H04N 1/00209 |
| | | | 358/402 |
| 2003/0016394 A1* | 1/2003 | Shinomiya | H04N 1/32641 |
| | | | 358/402 |
| 2005/0160292 A1* | 7/2005 | Batthish | H04L 63/045 |
| | | | 726/5 |
| 2007/0032267 A1* | 2/2007 | Haitani | H04M 1/274508 |
| | | | 455/556.2 |
| 2007/0116281 A1* | 5/2007 | Brown | G06Q 10/107 |
| | | | 380/239 |
| 2008/0109462 A1* | 5/2008 | Adams | G06Q 10/107 |
| 2008/0225335 A1* | 9/2008 | Shozaki | H04L 12/185 |
| | | | 358/1.15 |
| 2009/0124268 A1* | 5/2009 | McNamara | G06Q 10/107 |
| | | | 455/466 |
| 2012/0054285 A1* | 3/2012 | Garg | H04L 51/08 |
| | | | 709/206 |
| 2012/0278406 A1* | 11/2012 | Meisels | H04L 51/08 |
| | | | 709/206 |
| 2012/0293836 A1* | 11/2012 | Hiraike | H04N 1/32021 |
| | | | 358/1.15 |
| 2015/0163181 A1 | 6/2015 | Kupsh et al. | |
| 2015/0215240 A1* | 7/2015 | Salvaji | H04L 51/066 |
| | | | 709/206 |

OTHER PUBLICATIONS

Extended European Search Report dated Jan. 3, 2017 for European Patent Application No. 16181594.9.

* cited by examiner

METHOD AND DEVICE FOR ATTACHING MESSAGES STORED AT A DEVICE AS ATTACHMENTS TO A MESSAGE BEING COMPOSED AT THE DEVICE

FIELD

The specification relates generally to messages and specifically to a method and device for attaching messages stored at the device as attachments to a message being composed at the device.

BACKGROUND

The evolution of messaging applications executed by devices is currently quite active. Known methods of attaching files, such as previously received messages, to a message being composed at a device are slow and utilize significant bandwidth.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

In general, this disclosure is directed to a device, including, but not limited to, a mobile device which attaches messages stored at the device as attachments to a message being composed (hereinafter referred to as a composed message) at the mobile device. The mobile device converts each message that is selected for attachment to the composed message into a Multipurpose Internet Mail Extensions (MIME) attachment message, encodes the composed message and each MIME attachments message into a MIME message, and transmits the MIME message via a communication interface of the mobile device.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a device comprising: a memory storing a messaging application, a communication interface, a display device, and a processor configured to execute the messaging application to: render, at the display device, a composed message comprising an attach icon for attaching messages stored at the memory to the composed message and a send icon for sending the composed message; in response to detecting selection of the attach icon, render, at the display device, one or more message icons, each of the one or more message icons associated with a respective one of the messages stored at the memory; detect selection of at least one of the one or more message icons; for each message icon that is selected, convert a stored message associated with the message icon that is selected into a Multipurpose Internet Mail Extension (MIME) attachment message; encode the composed message and each MIME attachment message into a MIME message; and, in response to detecting selection of the send icon, transmit, using the communication interface, the MIME message.

Each message stored at the memory of the device can be associated with a corresponding message stored at a server.

At least one of the stored messages can comprise one or more pieces of the corresponding message.

The processor can be further configured to, for each message icon that is selected, convert the stored message associated with the message icon that is selected into the MIME attachment message based on each of the one or more pieces of the corresponding message that is included in the stored message.

The stored message associated with the message icon that is selected can include at least one of a message header of the corresponding message, a message body of the corresponding message, an indication of at least one image associated with the corresponding message, and an indication of at least one attachment associated with the corresponding message.

The processor can be further configured to convert the stored message associated with the message icon that is selected into the MIME attachment message based on the at least one of the message header of the corresponding message stored at the server, the message body of the corresponding message, and the indication of at least one attachment associated with the corresponding message that is included in the stored message.

The stored message for one of the message icons that is selected can include a message header of the corresponding message and a message body of the corresponding message. The processor can be further configured to convert the stored message associated with the message icon that is selected into the MIME attachment message by converting each of the message header and the message body into MIME.

The message stored in the memory can be an email message.

Another aspect of the specification provides a method comprising: at a device comprising, a processor, a memory, a communication interface, and a display device, rendering, at the display device a composed message comprising an attach icon for attaching messages stored at the memory and a send icon for sending the message; in response to detecting, at the processor, selection of the attach icon, rendering, at the display device, one or more message icons, each of the one or more message icons associated with a respective one of the stored messages; detecting, at the processor, selection of at least one of the one or more message icons; for each message icon that is selected, converting, at the processor, a stored message associated with the message icon that is selected into a MIME attachment message; encoding, at the processor, the message and each MIME attachment message into a MIME message; and, in response to detecting, at the processor, selection of the send icon, transmitting, via the communication interface, the MIME message.

Each message stored at the memory of the device can be associated with a corresponding message stored at a server.

At least one of the stored messages can comprise one or more pieces of the corresponding message.

The method can further comprise converting the stored message associated with the message icon that is selected into the MIME attachment message based on each of the one or more pieces of the corresponding message that is included in the stored message.

The stored message associated with the message icon that is selected can include at least one of a message header of the corresponding message, a message body of the corresponding message, an indication of at least one image associated with the corresponding message, and an indication of at least one attachment associated with the corresponding message.

The method can further comprise, for each message icon that is selected, converting the stored message associated with the message icon that is selected into the MIME attachment message based on the at least one of message header of the corresponding message, the message body of the corresponding message, the indication of at least one image associated with the corresponding message, and the indication of at least one attachment associated with the corresponding message included in the stored message.

The stored message for one of the message icons that is selected can include a message header of the corresponding message and a message body of the corresponding message. The processor can be further configured to convert the stored message associated with the message icon that is selected into the MIME attachment message by converting each of the message header and the message body into MIME.

The message stored in the memory can be an email message.

Another aspect of the specification provides a computer-readable medium storing a computer program, wherein execution of the computer program is for: at a mobile device comprising a display device, a memory and a communication interface, rendering, at the display device, a composed message, the composed message comprising an attach icon for attaching messages stored at the memory and a send icon for sending the message; in response to detecting, at the processor, selection of the attach icon, rendering, at the display device, one or more message icons, each of the one or more message icons associated with a respective one of the stored messages; detecting, at the processor, selection of at least one of the one or more message icons; for each message icon that is selected: converting, at the processor, a stored message associated with the message icon that is selected into a MIME attachment message; encoding, at the processor, the message and each MIME attachment message into a MIME message; and, in response to detecting, at the processor, selection of the send icon, transmitting, via the communication interface, the MIME message.

Figure 1:
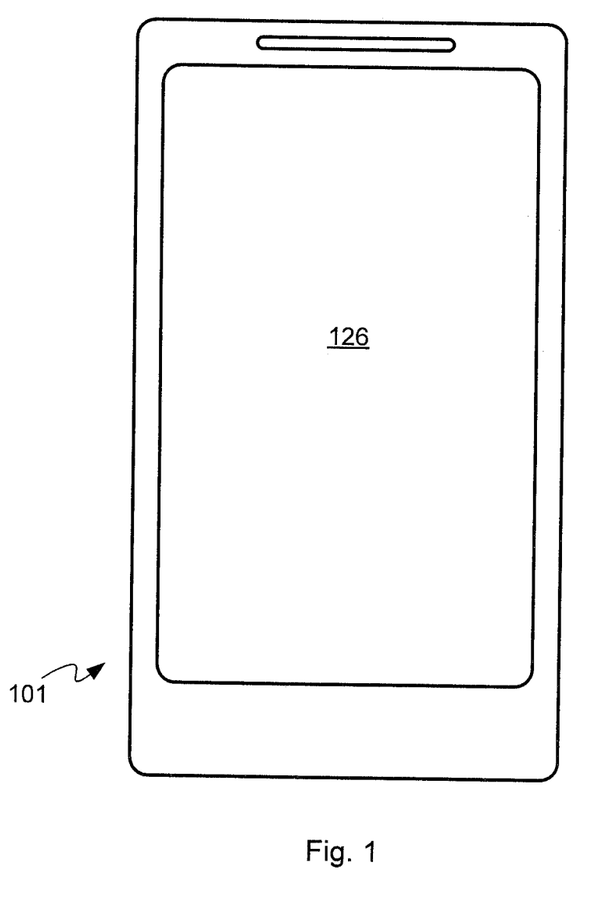
FIG. 1 depicts a mobile device configured for attaching messages stored at the mobile device as attachments to a message being composed at the device, according to non-limiting implementations.
Figure 2:
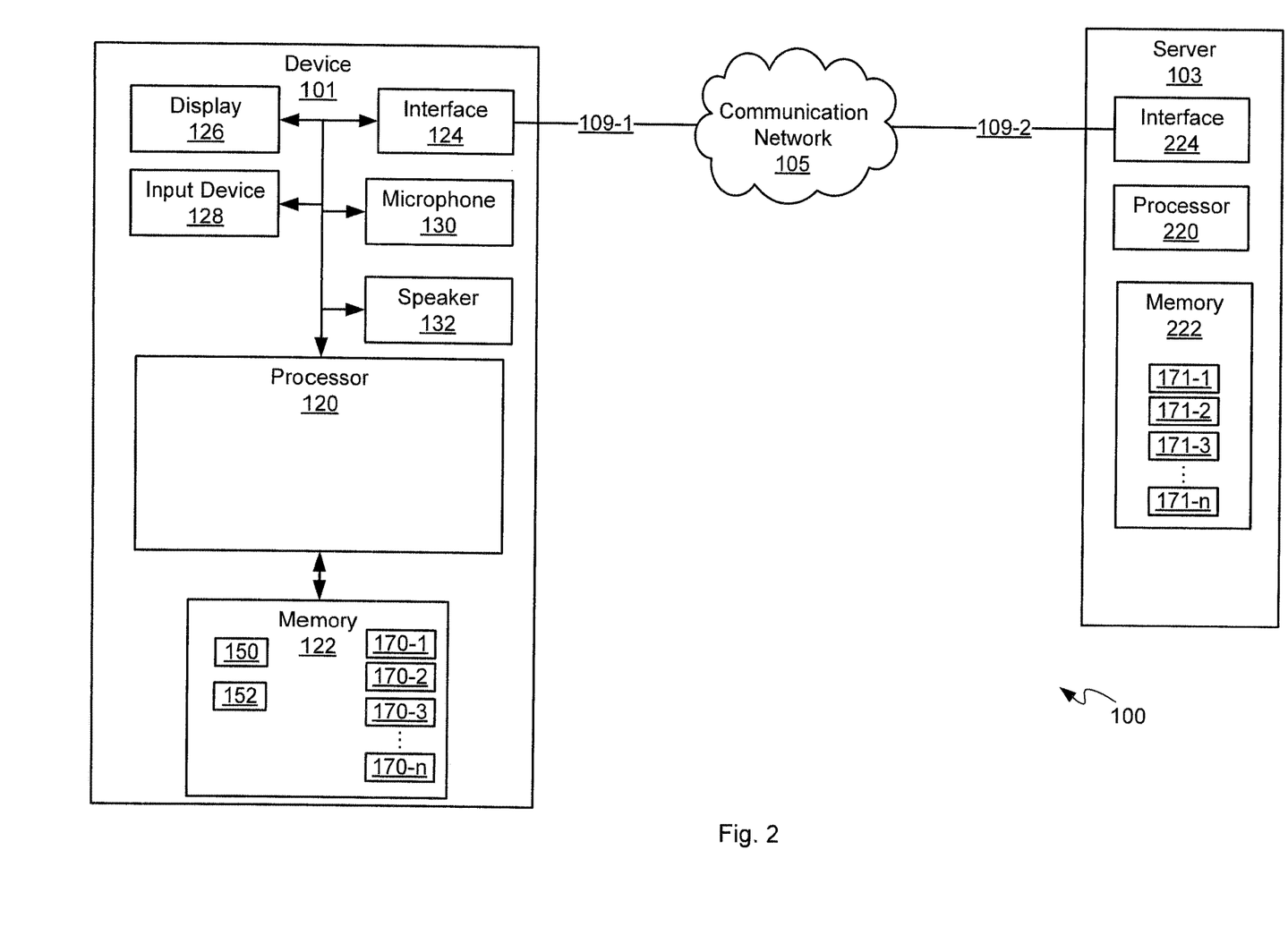
FIG. 2 depicts a schematic block diagram of a system configured for sending messages that includes the device of FIG. 1, according to non-limiting implementations.

FIG. 1 depicts a front perspective view of a mobile electronic device 101 (referred to interchangeably hereafter as device 101) configured for attaching messages to a message being composed at the device 101, according to non-limiting implementations; FIG. 2 depicts a system 100 which includes device 101, a server 103, a communication network 105 (referred to interchangeably hereafter as network 105). Device 101 and server 103 are configured to communicate with each other using network 105 and respective links 109-1, 109-2 according to non-limiting implementations. Links 109-1, 109-2, will be interchangeably referred to hereafter, collectively, as links 109, and generically as a link 109.

Also depicted are schematic block diagrams of each of device 101 and server 103 according to non-limiting implementations, as described hereafter.

Device 101 comprises a processor 120, a memory 122, a communication interface 124, an input device 128 and a display device 126, processor 120 configured to; render, at display device 126, a composed message comprising an attach icon for attaching messages stored at memory 122 to the composed message and a send icon for sending the composed message; in response to detecting a selection of the attach icon, render, at display device 126, one or more message icons, each of the one or more message icons associated with a respective one of the messages stored at memory 122; detect selection of at least one of the one or more message icons; for each message icon that is selected: convert a stored message associated with the message icon that is selected into a Multipurpose Internet Mail Extension (MIME) attachment message; encode the composed message and each MIME attachment message into a MIME message; and, in response to detecting selection of the send icon, transmit, using communication interface 124, the MIME message over link 109-1 to network 105. Processor 120 can detect selection of the attach icon when, for example, an input indication selection of the attach icon is received from input device 128. Similarly, processor 120 can detect the selection of the at least one message icon and/or the send icon when, for example, an input indication selection of the at least one message icon or the send icon is received from input device 128.

Device 101, as depicted, comprises an optional microphone 130 and an optional speaker 132. Messages stored at memory 122 can include, but are not limited to, email messages, SMS (short message service) messages, MMS (multimedia messaging service) messages, text messages, calendar invitations and the like.

Server 103 generally comprises a processor 220, a memory 222 and a communication interface 224. Server 103 and/or processor 220 is generally configured to receive the composed message over link 109-2, store the composed message in memory 222, and transmit the composed message over communication network 105.

Network 105 can comprise any suitable combination of: wired networks, wireless networks, cell-phone networks, cellular networks (including but not limited to 2G, 2, 5G, 3G, 4G+, and the like), Bluetooth networks, NFC (near field communication) networks, WiFi networks, WiMax networks, packet based networks, the Internet, analog networks, the PSTN (public switched telephone network), WiFi access points, and the like, and/or a combination.

Links 109 comprises any suitable links for enabling device 101 and server 103 to communicate using network 105. Links 109 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), WiFi access points, and the like, and/or a combination.

Device 101 will now be described in further detail. Device 101 can be any type of electronic device that can be used in a self-contained manner. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

It should be emphasized that the structure of device 101 in FIG. 2 is purely an example, and contemplates a device that can be used for both wireless voice (e.g. telephony) and wireless data communications (e.g. email, web browsing, text, and the like). However, while FIG. 2 contemplates a device that can be used for telephony and/or messaging, in other implementations, device 101 can comprise a device configured for implementing any suitable specialized functions, including but not limited to one or more of telephony, messaging, computing, appliance, and/or entertainment related functions.

Device 101 comprises at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations. In specific non-limiting implementations described herein, input device 128 comprises a touch screen for receiving touch input data.

Input from input device 128 is received at processor 120 (which can be implemented as a plurality of processors, including but not limited to one or more central processors (CPUs) and/or one or more processing units; either way, processor 120 comprises a hardware element and/or a hardware processor of device 101). Processor 120 is configured to communicate with memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module and/or a non-volatile memory.

In particular, memory 122 stores messaging application 150 that, when executed by processor 120, enables processor 120 to: render, at display device 126, a messaging, a composed message comprising an attach icon for attaching messages associated with device 101 and a send icon for sending the message; in response to detecting a selection of the attach icon, render, at display device 126 in the messaging application, one or more message icons, each of the one of the one or more message icons associated with a respective one of the messages associated with device 101; detects selection of at least one of the one or more message icons; for each message icon that is selected: converts a stored message associated with the message icon that is selected into a MIME attachment message; encodes the message and each MIME attachment message into a MIME message; and, in response to detecting selection of the send icon, transmits, via communication interface 124, the MIME message. Memory 122 also stores a library 152 which operates with messaging application 150 when messaging application 150 is executed by processor 120 as described in further detail below.

Memory 122 further stores messages 170-1, 170-2, 170-3 . . . -170-*n*, (interchangeably referred to hereafter, collectively, as messages 170, and generically as a message 170). Server 103 receives from communication network 105 over link 109-2 and interface 224 corresponding messages 171-1, 171-2, 171-3 . . . -171-*n* associated with device 101, (interchangeably referred to hereafter, collectively, as corresponding messages 171, and generically as a message 171), and stores each corresponding message 171 in memory 222. Server 103 also generates messages 170 and transmits messages 170 to device 101, with messages 170 being in a one-to-one relationship with a corresponding message 171. One or more messages 170 can comprise one or more distinct pieces of its corresponding message 171; in a non-limiting example, one or more messages 170 can comprise the following distinct pieces of its corresponding message 171, a message header of its corresponding message 171, a message body/content of its corresponding message, an indication of associated attachments of its corresponding message 171, but not the attachments themselves; and an indication of associated images of corresponding message 171, but not the images themselves. Rather, associated images and/or attachments can be requested from server 103 by device 101 upon selection and/or activation of an associated indication. Alternatively, one or more messages 170 can comprise the entirety of its corresponding message 171.

Messages 170, 171 can include, but are not limited to, email messages, SMS (short message service) messages, MMS (multimedia messaging service) messages, text messages, calendar invitations and the like. In some implementations, messages can include, but are not limited to: notes and/or note data, tasks and/or task data and contacts and/or contact data; such notes and/or note data, tasks and/or task data and contacts and/or contact data can be included as attachments to the message.

Processor 120 can also be configured to communicate with a display device 126, and optionally a microphone 130 and a speaker 132. Display device 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display device 126 comprises a touch screen, display device 126 and input device 128 can be combined into one apparatus. Microphone 130 comprises any suitable microphone for receiving sound data. Speaker 132 comprises any suitable speaker for providing sound data, audible alerts, audible communications from remote devices, and the like, at device 101.

In some implementations, input device 128 and display device 126 are external to device 101, with processor 120 in communication with each of input device 128 and display device 126 via a suitable connection and/or link.

Processor 120 also connects to communication interface 124, which can be implemented as one or more radios and/or connectors and/or network adaptors and/or antennas, configured to communicate with network 105 via link 109-1. In general, communication interface 124 is configured to correspond with the network architecture that is used to implement link 109-1, as described above. In other implementations a plurality of links with different protocols can be employed and thus communication interface 124 can comprise a plurality of interfaces to support each link. Regardless, communication interface 124 is configured to establish a roaming data connection with network 105 using one or more links 109. Indeed, any suitable combination of communication interfaces is within the scope of present implementations.

While not depicted, device 101 further comprises a power source, for example a connection to a battery, a power pack and the like and/or a connection to a main power supply and a power adaptor (e.g. and AC-to-DC (alternating current to direct current) adaptor, and the like), which can be used to power device 101 and/or charge a battery and the like.

Further, it should be understood that in general a wide variety of configurations for device 101 are contemplated.

Server 103 generally comprises one or more servers configured to manage messages 170, 171 on behalf of device 101, as well as communicate with device 101 via link 109-2 and network 105. Server 103 can be based on any well-known server environment including a module that houses one or more central processing units, volatile memory (e.g. random access memory), persistent memory (e.g. hard disk devices) and network interfaces to allow server 103 to communicate over link 109-2. For example, server 103 can comprise a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for server 103 are contemplated. For example, server 103 can comprise a computing device, including but not limited to one or more of a personal computer, a laptop computer, and a mobile computing device, configured to manage messages 170, 171 using network 105 and links 109.

In particular, server 103 can be configured to receive messages 171, from other computing devices, store messages 171, and generate messages 170, and transmit messages 170 to device 101, as well as forward messages received from device 101 on behalf of device 101. Server 103 can be configured to receive messages 171 from any suitable computing device, such as for example, another mobile device, a laptop computer, or a desktop computer.

Figure 3:
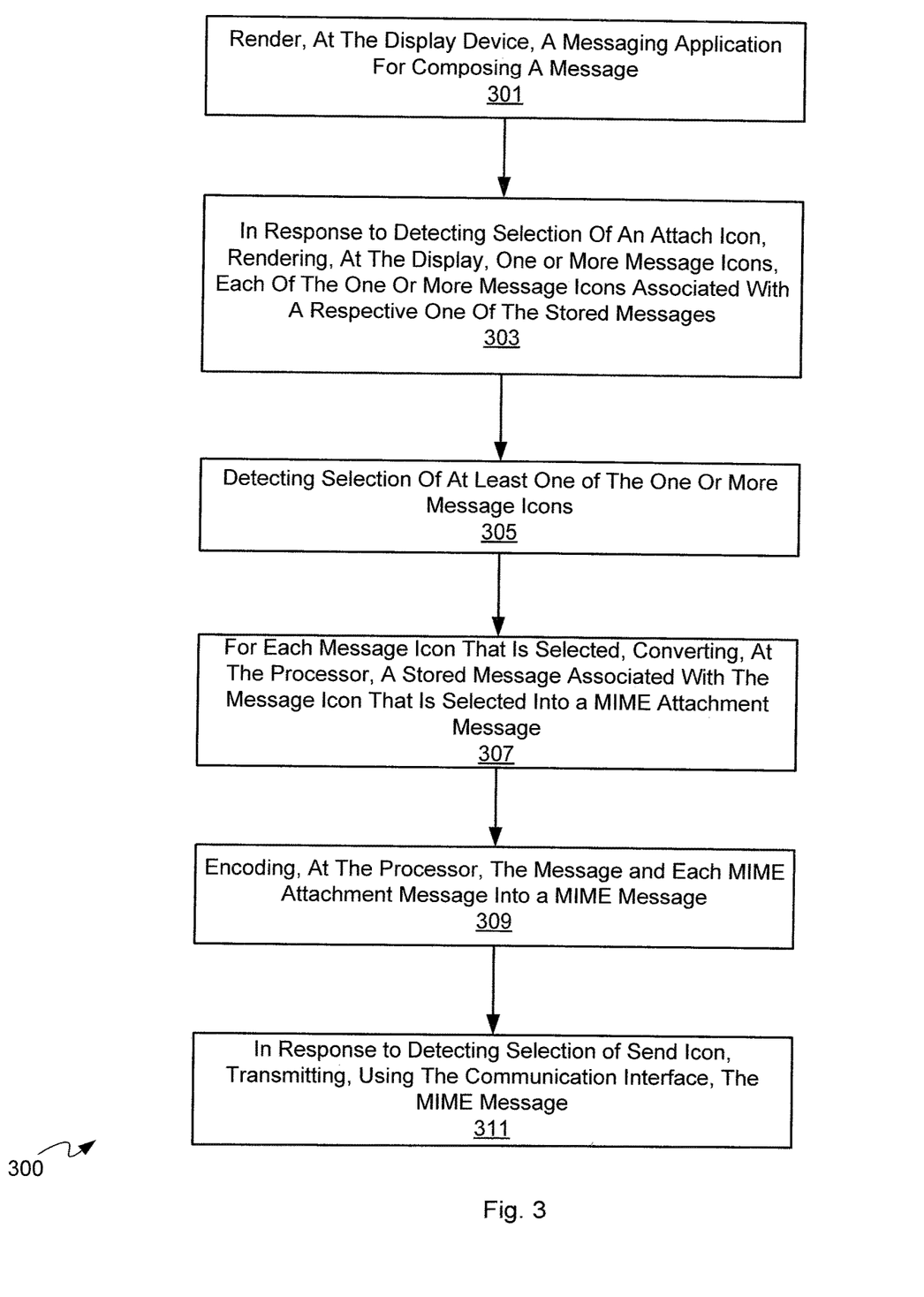
FIG. 3 depicts a method for attaching messages stored at the mobile device as attachments to a message being composed at the device, according to non-limiting implementations.

Attention is now directed to FIG. 3 which depicts a flowchart of a method 300 for attaching messages stored at device 101 to a message being composed and sent by device 101, according to non-limiting implementations. In order to assist in the explanation of method 300, it will be assumed that method 300 is performed using system 100, and specifically by processor 120 of device 101, for example when processor 120 processes messaging application 150 and library 152. Indeed, method 300 is one way in which device 101 can be configured. Furthermore, the following discussion of method 300 will lead to a further understanding of device 101, and system 100 and its various components. However, it is to be understood that system 100 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 100 as well.

At block 301, processor 120 executes messaging application 150 to render, at display device 126, a composed message. Composed message comprises an attach icon for attaching messages 170 stored at memory 122 and a send icon for sending the composed message.

At block 303, processor 120, in response to detecting selection of the attach icon, renders, at display device 126, one or more message icons. Each of the one or more message icons is associated with a respective one of messages 170 stored in memory 122.

At block 305, processor 120, detects selection of at least one of the one or more message icons.

At block 307, for each message icon that is selected, processor 120 executes library 152 and converts stored message 170 associated with each message icon that is selected into a MIME attachment message. In a non-limiting implementation, stored message 170 comprises one or more distinct pieces of corresponding message 171 and processor 120 executes library 152 to convert stored message 170 associated with each message icon that is selected into a MIME attachment message based on the each piece of corresponding message 171 that is included in stored message 170. When processor 120 executes library 152, library 152 is configured to receive, from messaging application 150, each distinct piece of corresponding message 171 that is included in stored message 170, and convert each distinct piece that is received into MIME in accordance with the Internet Engineering Task Force RFC 822 standard. Library 152 is configured to generate a MIME attachment message that includes the MIME for each piece of corresponding message 171 that is included in stored message 170.

In an implementation, the stored message 170 includes a message header of its corresponding message 171, a message body/content of its corresponding message 171, message images of its corresponding message 171, and message attachments of its corresponding message 171. In this implementation, when processor 120 executes library 152, library 152 receives, from messaging application 150, the message header, the message body/content, the message images, and the message attachments, converts each of the message header, the message body/content, the message images, and the message attachments into MIME in accordance with the Internet Engineering Task Force RFC 822 standard, and generates a MIME attachment message that includes the MIME for each of the message header, the message body/content, the message images, and the message attachments.

At block 309, after each message that is associated with a message icon that is selected is converted to a MIME attachment message, processor 120 encodes the composed message and each MIME attachment message into a MIME message. In a non-limiting implementation, processor 120 again executes library 152, which is configured to receive segments of composed message from messaging application 150 and convert each segments of composed message into MIME in accordance with the Internet Engineering Task Force RFC 822 standard. The segments of composed message received by library 152 can include a message header of composed message, a message body/content of composed message, and each MIME attachment message generated at block 307. The segments of composed message received by library 152 can also include images of composed message and further non-message attachments of composed message, such as for example images files, video files, and document files.

At block 311, processor 120, in response to detecting selection of the send icon, transmits, using communication interface 124, the composed message to network 105.

Method 300 will now be discussed with reference to FIGS. 4 to 7, with FIG. 4, FIG. 5, and FIG. 6 being substantially similar to FIG. 1, with like elements having like numbers, and FIG. 7 being substantially similar to FIG. 2, with like elements having like numbers.

Figure 4:
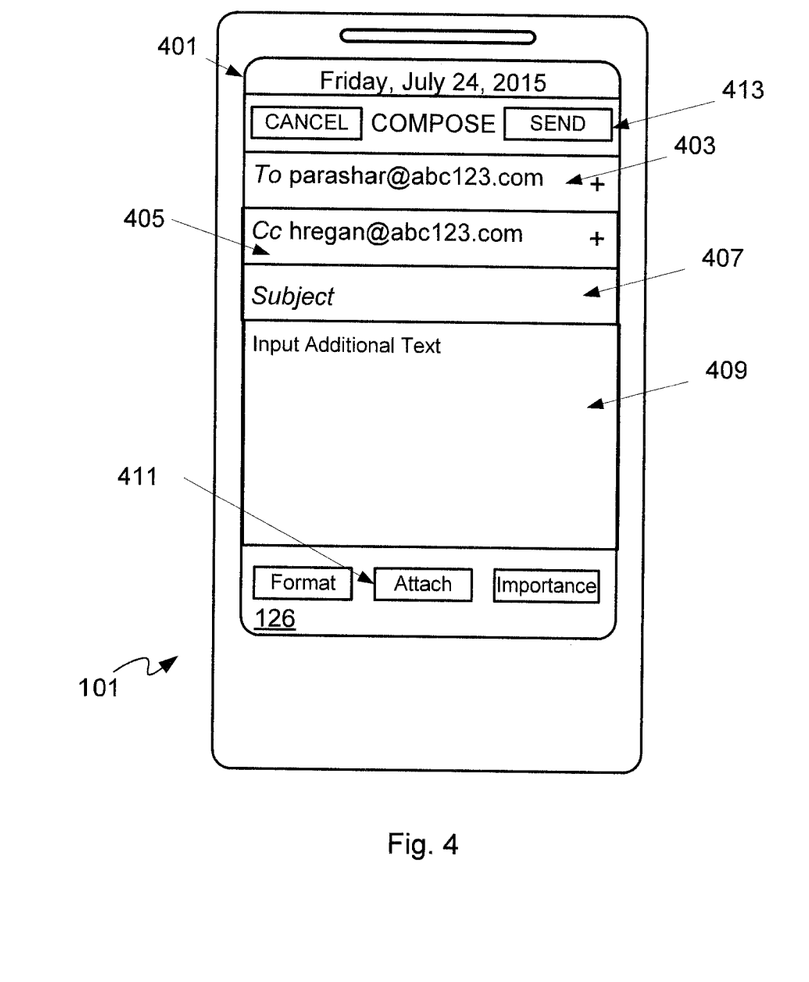
FIG. 4 depicts a message being composed rendered at the device of FIG. 1, according to non-limiting implementations.
Figure 5:
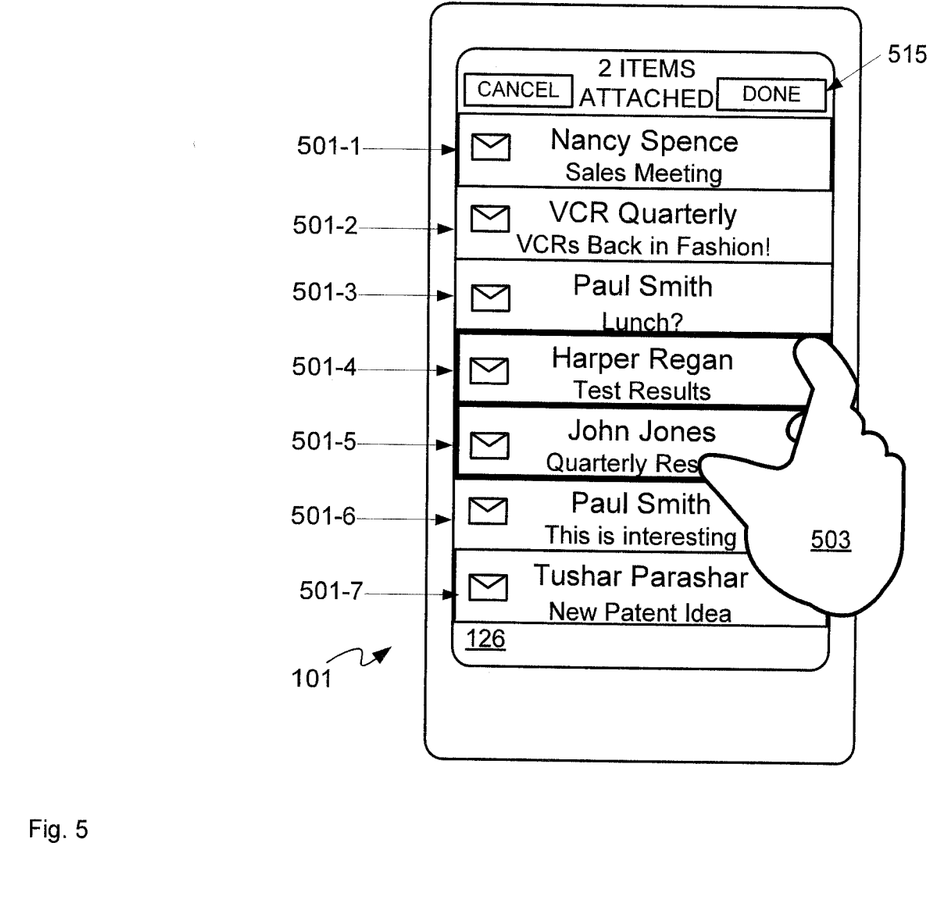
FIG. 5 depicts a message list rendered at the device of FIG. 1, as well as selection of message icons in the message list, according to non-limiting implementations.
Figure 6:
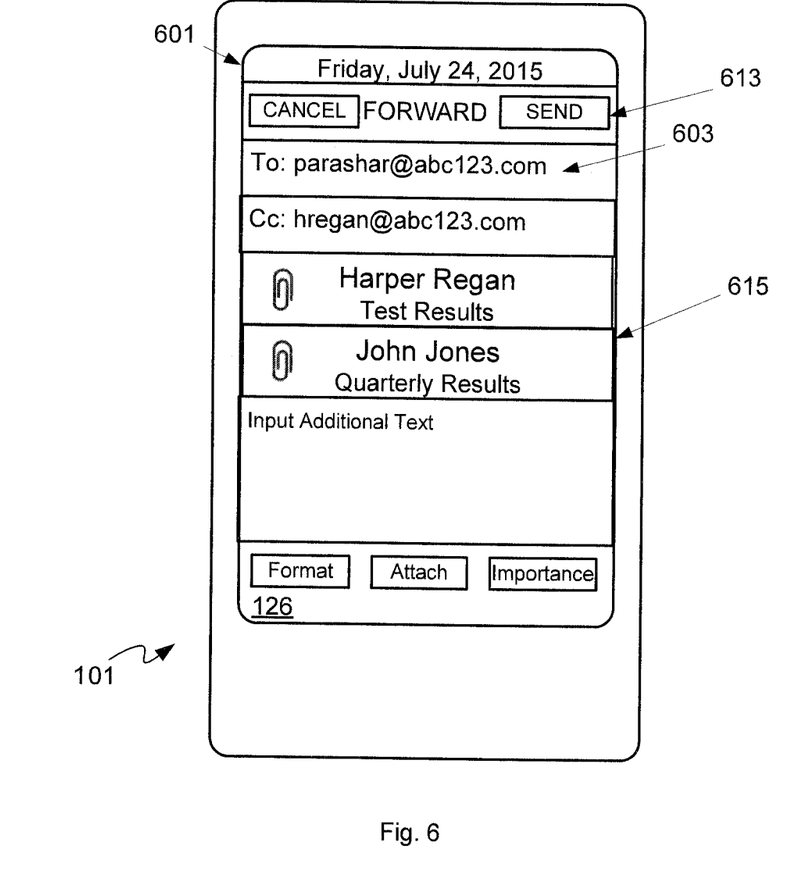
FIG. 6 depicts the message being composed rendered at the device of FIG. 1, after selection of message icons in the message list, according to non-limiting implementations.

In particular, FIG. 4, FIG. 5, and FIG. 6 depict a front perspective view of device 101, including display device 126, and various graphic user interfaces (GUIs) rendered at display device 126 under control of processor 120.

Attention is next directed to FIG. 4 which depicts an email message 401 being composed at device 101 (also referred to herein as "composed email message" or "composed message"). Composed message 401 is rendered at display device 126 after processor 120 detects selection of a compose message icon (not shown). Composed message 401 includes: a To: field 403 that includes one or more email addresses to which email message 401 is to be sent; a Cc: field (e.g. "carbon copy" field) 405 which includes one or more further email addresses to which email message 401 is to be sent; a subject field 407 which includes text that specifies a subject of composed message 401; a body field 409 which includes text for a body of composed message 401, and an attach icon 411 for attaching files to the composed message 401, such as image files, video files, document files, and email messages that are stored in memory 122 of device 101. Composed message 401 also includes a send icon 413 for sending the composed message 401 to the email addresses included in the To: and Cc: fields, 403, 405, respectively. Composed message 401 also includes a format icon 415 for formatting composed message 401, and an importance icon 417 for selecting an importance level for composed message 401.

In the implementation shown in FIG. 4, that display device 126 includes a touchscreen display and input device 128 includes the touchscreen display, though, as depicted, input device 128 also includes a button, a touchpad and the like. Email address can be received in To: field 403, for example, from a keyboard and/or a virtual keyboard and/or as a selection from a contact list. Each email address in To: field 403 can be a single email address or a distribution list selected from, for example a contact list. Similarly, each further email address can be received in Cc: field 405, for example, from a keyboard and/or a virtual keyboard and/or as a selection from a contact list.

Attention is next directed to FIG. 5 which depicts messages icons 501-1, 501-2, . . . 501-n (interchangeably referred to hereafter, collectively, as message icons 501, and generically as a message icon 501) rendered at display device 126 (e.g. block 303 of method 300) and a Done icon 515, where each message icon 501 is associated with one message 170 stored in memory 122. In the non-limiting implementation shown in FIG. 5, seven message icons 501-1, 501-2, 501-3, 501-4, 501-5, 501-6, and 501-7 are depicted, and each message icon 501 is associated with a respective one of seven messages 170 stored in memory 122 at the device.

In the non-limiting implementation depicted in FIG. 5, message icon 501-1 is associated with message 170-1; message icon 501-2 is associated with message 170-2; message icon 501-3 is associated with message 170-3; message icon 501-4 is associated with message 170-4; message icon 501-5 is associated with message 170-5; message icon 501-6 is associated with message 170-6; and message icon 501-7 is associated with message 170-7. In the implementation depicted in FIG. 5, display device 126 also includes a touchscreen display and that input device 128 includes the touchscreen display, though, as depicted, input device 128 also includes a button, a touchpad and the like. Hence, FIG. 5 further depicts a hand 503 of a user interacting with the touchscreen; in particular, through such interaction with the touchscreen, processor 120 detects selection at block 305 of two message icons 501, for example message icon 501-4 associated with message 170-4 from "Harper Regan", and message icon 501-5 associated with message 170-5 from "John Jones". Detection of selection at block 305 is indicated in FIG. 5 by associated lines being of a heavier weight than lines of unselected messages; however such selections can be indicated in other suitable ways, included, but not limited to, changes in colour, font, and the like of selected messages and/or through the use of selected message icons.

Although message icons 501 rendered on display device 126 are depicted in a list with each row of the list being a message icon 501, message icons 501 can be rendered on display device in other suitable formats. Furthermore, while message icons 501, as depicted, specifically represent email messages, message icons 501 can represent other types of messages including, but not limited to SMS (short message service) messages, MMS (multimedia messaging service) messages, text messages, calendar invitations and the like. Moreover, although seven message icons 501 are rendered on display device 126 in the non-limiting implementation shown in FIG. 5, any suitable number of message icons 501 may be rendered on the display device 126.

While not depicted, in the non-limiting implementation shown in FIG. 4 to FIG. 7, message 170-4 associated with message icon 501-4 includes a message header and a message body of corresponding message 171-4. The message 170-4 is absent attachments, graphics, and/or any additional data that was not received from server 103 to save bandwidth. Similarly, message 170-5 associated with message icon 501-5 includes a message header, a message body, and a message image of corresponding message 171-5. Message 170-5 is absent attachments and/or any additional data that was not received from server 103 to save bandwidth.

When selection of Done icon 515 is detected by processor 120, messages 170-4, 170-5 are each converted at block 307 to a MIME attachment message. Composed message 601 and each MIME attachment message and then encoded at block 309 into a MIME message. In the non-limiting implementation shown in FIG. 6, when selection of Done icon 515 is detected by processor 120, the message header and the message body of message 170-4 are each converted to MIME in accordance with the Internet Engineering Task Force RFC 822 standard at block 307. Also, the message header, the message body, and the message image of message 170-5 are each converted to MIME in accordance with the Internet Engineering Task Force RFC 822 standard at block 307. Also at block 307, library 152 generates a MIME attachment message that includes the MIME of the message header of message 170-4, the MIME of the message body of message 170-4, the MIME of the message header of message 170-5, MIME of the message body of message 170-5, and the MIME of the message image of message 170-5 in at block 307 to a MIME attachment message by library 152.

Attention is next directed to FIG. 6 which is substantially similar to FIG. 4, with like elements having like numbers, which depicts composed message 601 with an attachment field 615 in which message icons 601-4, 605 are rendered.

Figure 7:
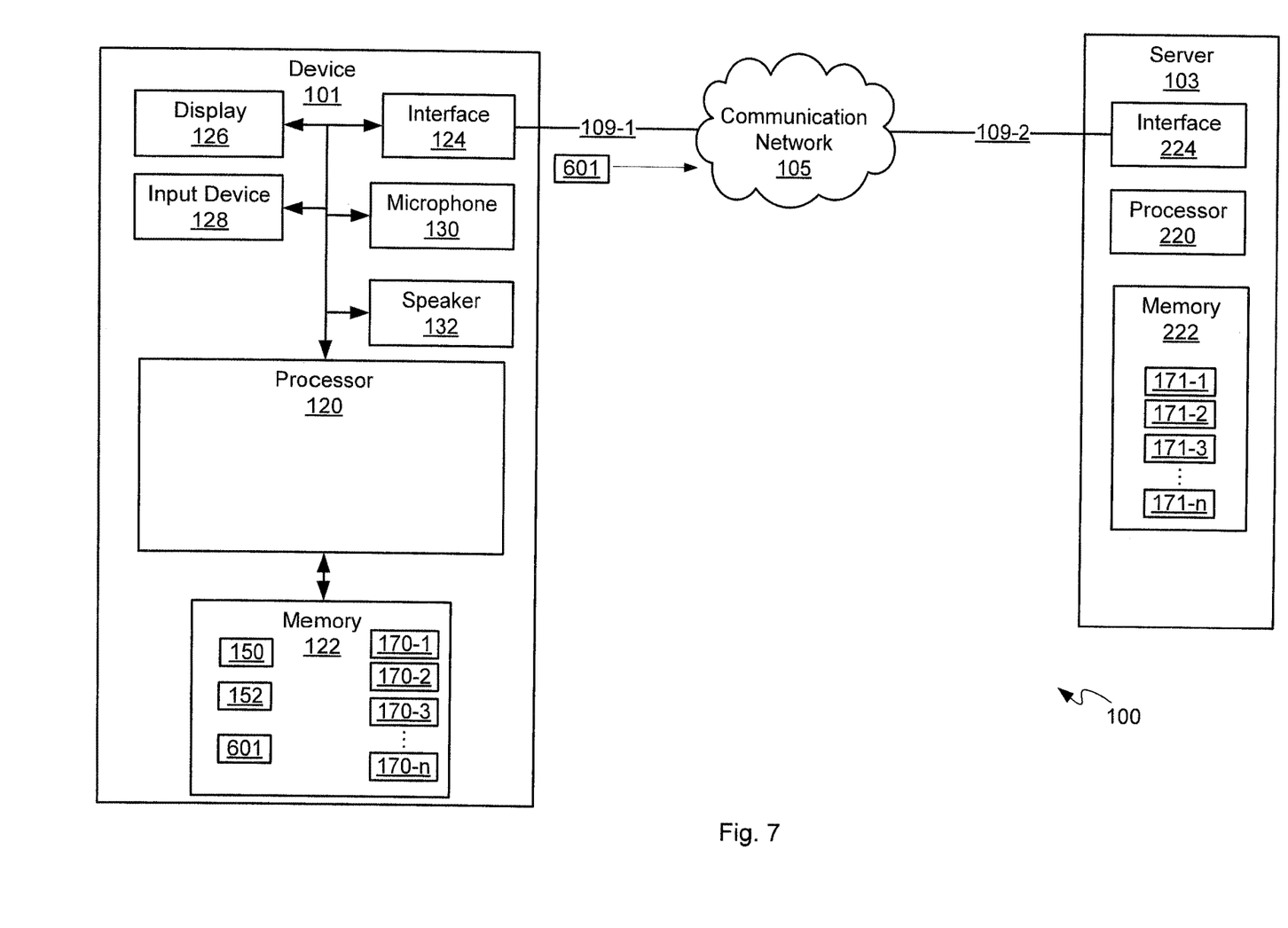
FIG. 7 depicts a schematic block diagram of a system configured for sending messages that includes the device of FIG. 1 and the composed message of FIG. 6, according to non-limiting implementations.

When selection of Send icon 613 is detected by processor 120, processor 120 transmits at block 311 the MIME message using communication interface 124 to network 105 over link 109-1 as shown in FIG. 7.

Attention is next directed to FIG. 7 which is substantially similar to FIG. 2, with like elements having like numbers, which depicts composed message 601 being transmitted by device 101 over link 109-1 using interface 124 when processor 120 detects selection of Send Icon 613. FIG. 7 also depicts composed message stored in memory 122 after processor 120 detects selection of Send Icon 613.

Described herein are a method and device for attaching messages stored at a device as attachments to a message being composed at the device. Each message that is selected for attachment to the composed message is converted into a Multipurpose Internet Mail Extensions (MIME) attachment message. The composed message and each MIME attachment message are then encoded into a MIME message and the MIME message is transmitted by the device, using interface of the device. The conversion of each message that is selected for attachment to the composed message into a MIME attachment message facilitates the attachment of such messages being composed, reduces processing time required to attach such messages, and reduces the bandwidth required to attach such messages to a message being composed.

Those skilled in the art will appreciate that in some implementations, the functionality of devices 101 and server 103 can be implemented using pre-programmed hardware or firmware elements (e.g., application specific integrated circuits (ASICs), electrically erasable programmable read-only memories (EEPROMs), etc.), or other related components. In other implementations, the functionality of device 101 and server 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
    a communication interface configured to communicate with a server to receive messages from the server, wherein each of the messages received from the server comprises one or more pieces of a corresponding message stored at the server;
    a memory storing a messaging application and the messages received from the server;
    a display device; and
    a processor configured to execute the messaging application to:
        render, at the display device, a composed message comprising an attach icon for attaching the messages stored at the memory to the composed message and a send icon for sending the composed message;
        in response to detecting selection of the attach icon, render, at the display device, one or more message icons, each of the one or more message icons associated with a respective one of the messages stored at the memory, wherein a type of the stored messages with which the one or more message icons are associated comprises one or more of email messages, short message service "SMS" messages, multimedia messaging service "MMS" messages, and calendar invitations;
        detect selection of at least one of the one or more message icons;
        for each message icon that is selected:
            (I) retrieve, from the memory of the device, one of the stored messages associated with the message icon that is selected;
            (II) convert the stored message into a Multipurpose Internet Mail Extension (MIME) attachment message; and
            (III) attach the MIME attachment message to the composed message;
        encode the composed message and each MIME attachment message generated at step (II) attached to the composed message into a MIME message; and,
        in response to detecting selection of the send icon, transmit, using the communication interface, the MIME message.

2. The device of claim 1, wherein the stored message associated with the message icon that is selected includes at least one of a message header of the corresponding message, a message body of the corresponding message, an indication of at least one image associated with the corresponding message, one or more images of the corresponding message, or an indication of at least one attachment associated with the corresponding message.

3. The device of claim 2, wherein the processor is further configured to convert the stored message associated with the message icon that is selected into the MIME attachment message based on the at least one of the message header of the corresponding message, the message body of the corresponding message, the indication of at least one image associated with the corresponding message, or the indication of at least one attachment associated with the corresponding message.

4. The device of claim 1, wherein, for one of the message icons that is selected, the stored message includes a message header of the corresponding message stored at the server and a message body of the corresponding message stored at the server; and wherein the processor is further configured to convert the stored message associated with the message icon that is selected into the MIME attachment message by converting each of the message header and the message body into MIME.

5. The device of claim 1, wherein the message stored in the memory is an email message.

6. A method comprising:
at a mobile device comprising a processor, a memory, a communication interface, and a display device,
receiving, at the communication interface, messages from a server, wherein each of the messages received from the server comprises one or more pieces of a corresponding message stored at the server;
storing the messages received from the server in the memory;
rendering, at the display device a composed message comprising an attach icon for attaching the messages stored at the memory and a send icon for sending the message;
in response to detecting, at the processor, selection of the attach icon, rendering, at the display device, one or more message icons, each of the one or more message icons associated with a respective one of the stored messages, wherein a type of the stored messages with which the one or more message icons are associated comprises one or more of email messages, short message service "SMS" messages, multimedia messaging service "MMS" messages, and calendar invitations;
detecting, at the processor, selection of at least one of the one or more message icons;
for each message icon that is selected:
(I) retrieving, from the memory of the mobile device, one of the stored messages associated with the message icon that is selected;
(II) converting, at the processor, the stored message into a Multipurpose Internet Mail Extension (MIME) attachment message; and
(III) attaching the MIME message to the composed message;
encoding, at the processor, the composed message and each MIME attachment message generated at step (II) attached to the composed message into a MIME message; and,
in response to detecting, at the processor, selection of the send icon, transmitting via the communication interface, the MIME message.

7. The method of claim 6, wherein the stored message associated with the message icon that is selected includes at least one of a message header of the corresponding message, a message body of the corresponding message, an indication of at least one image associated with the corresponding message, or an indication of at least one attachment associated with the corresponding message.

8. The method of claim 7, wherein converting further comprises converting the stored message associated with the message icon that is selected into the MIME attachment message based on the at least one of the message header of the corresponding message stored, the message body of the corresponding message stored at the server, the indication of at least one image associated with the corresponding message, or the indication of at least one attachment associated with the corresponding message that is included in the stored message.

9. The method of claim 7, wherein, for one of the message icons that is selected, the stored message includes a message header of the corresponding message and a message body of the corresponding message; and wherein converting further comprises converting each of the message header and the message body into MIME.

10. The method of claim 6, wherein the message stored in the memory is an email message.

11. A non-transitory computer-readable medium storing a computer program, wherein execution of the computer to perform:
at a mobile device comprising a display device, a memory and a communication interface,
receiving, at the communication interface, messages from a server, wherein each of the messages received from the server comprises one or more pieces of a corresponding message stored at the server;
storing the messages received from the server in the memory;
rendering, at the display device, a composed message, the composed message comprising an attach icon for attaching the messages stored at the memory and a send icon for sending the message;
in response to detecting, at a processor, selection of the attach icon, rendering, at the display device, one or more message icons, each of the one or more message icons associated with a respective one of the stored messages, wherein a type of the stored messages with which the one or more message icons are associated comprises one or more of email messages, short message service "SMS" messages, multimedia messaging service "MMS" messages, and calendar invitations;
detecting, at the processor, selection of at least one of the one or more message icons;
for each message icon that is selected:
(I) retrieving, from the memory of the device, one of the stored messages associated with the message icon that is selected;
(II) converting, at the processor, the stored message into a Multipurpose Internet Mail Extension (MIME) attachment message; and
(III) attaching the MIME message to the composed message;
encoding, at the processor, the composed message and each MIME attachment message generated at step (II) attached to the composed message into a MIME message; and,
in response to detecting, at the processor, selection of the send icon, transmitting, via the communication interface, the MIME message.

12. The non-transitory computer-readable medium of claim 11, wherein the stored message associated with the message icon that is selected includes at least one of a message header of the corresponding message, a message body of the corresponding message, an indication of at least one image associated with the corresponding message, one or more images of the corresponding message, or an indication of at least one attachment associated with the corresponding message.

13. The non-transitory computer-readable medium of claim 12, wherein converting further comprises converting the stored message associated with the message icon that is selected into the MIME attachment message based on the at least one of the message header of the corresponding message stored, the message body of the corresponding message stored at the server, the indication of at least one image associated with the corresponding message, or the indication of at least one attachment associated with the corresponding message that is included in the stored message.

14. The non-transitory computer-readable medium of claim 11, wherein for one of the message icons that is selected, the stored message includes a message header of the corresponding message stored at the server and a message body of the corresponding message stored at the server; and wherein the processor is further configured to convert the stored message associated with the message icon that is selected into the MIME attachment message by converting each of the message header and the message body into MIME.

15. The non-transitory computer-readable medium of claim 11, wherein the message stored in the memory is an email message.

\* \* \* \* \*